US012699379B2

(12) United States Patent
Carter et al.

(10) Patent No.: US 12,699,379 B2
(45) Date of Patent: Aug. 4, 2026

(54) SYSTEMS AND METHODS FOR DIAGNOSING MANUFACTURING SYSTEMS

(71) Applicant: ATS Corporation, Cambridge (CA)

(72) Inventors: Amy Carter, Cambridge (CA);
Gregory Sullivan, Cambridge (CA);
Cody Howarth, Cambridge (CA);
Kevin Boronka, Cambridge (CA)

(73) Assignee: ATS CORPORATIO, Cambridge (CA)

( * ) Notice: Subject to any disclaimer, the term of this patent is extended or adjusted under 35 U.S.C. 154(b) by 392 days.

(21) Appl. No.: 18/465,079

(22) Filed: Sep. 11, 2023

(65) Prior Publication Data

US 2024/0184273 A1      Jun. 6, 2024

Related U.S. Application Data

(60) Provisional application No. 63/405,028, filed on Sep. 9, 2022.

(51) Int. Cl.
G05B 19/418          (2006.01)

(52) U.S. Cl.
CPC .................. G05B 19/41835 (2013.01); G05B 2219/31372 (2013.01)

(58) Field of Classification Search
CPC .... G05B 19/41835; G05B 2219/31372; G05B 19/4061; G05B 19/41875; G05B 2219/40607
See application file for complete search history.

(56) References Cited

U.S. PATENT DOCUMENTS

| | | | |
|---|---|---|---|
| 8,266,540 B2 * | 9/2012 | Bakli | G06Q 10/10 |
| | | | 715/731 |
| 2018/0029227 A1 * | 2/2018 | Linnell | B25J 13/089 |
| 2019/0302751 A1 | 10/2019 | Aikens et al. | |
| 2021/0097442 A1 | 4/2021 | Cameron et al. | |
| 2022/0066435 A1 | 3/2022 | Thimmanaik et al. | |

FOREIGN PATENT DOCUMENTS

EP          3835902 A1       6/2021

OTHER PUBLICATIONS

Extended European Search Report, The Hague (Jan. 17, 2024).

* cited by examiner

*Primary Examiner* — Daryl C Pope
(74) *Attorney, Agent, or Firm* — Valauskas Corder LLC

(57)          ABSTRACT

Disclosed herein is a method and apparatus for observing a manufacturing line, wherein the manufacturing line includes at least one robotic element for moving at least one part, the method comprising receiving, at a processor separate from the manufacturing line, sensor data about the at least one robotic element, and when the sensor data exceeds a boundary condition, triggering a feed-back collection event. The feed-back collection event includes identifying a stream of sensor data, capturing feed-back data at a data collection device associated with the at least one robotic element, tagging the feed-back data to reflect the at least one part associated with the boundary condition, identifying, within the feed-back data, when the boundary condition is exceeded by the at least one part in real time, and storing the feed-back data relating to the boundary condition in association with the sensor data and the boundary condition.

18 Claims, 4 Drawing Sheets

300

305
Monitor Sensor Data for
Boundary Condition

310
Boundary
Condition
Exceeded

N

Y

315
Tagging Feed-Back
Data

320
Identifying
Exceeding
Boundary Condition

330
Output Feed-Back
Data

325
Storing Feed-Back
Data

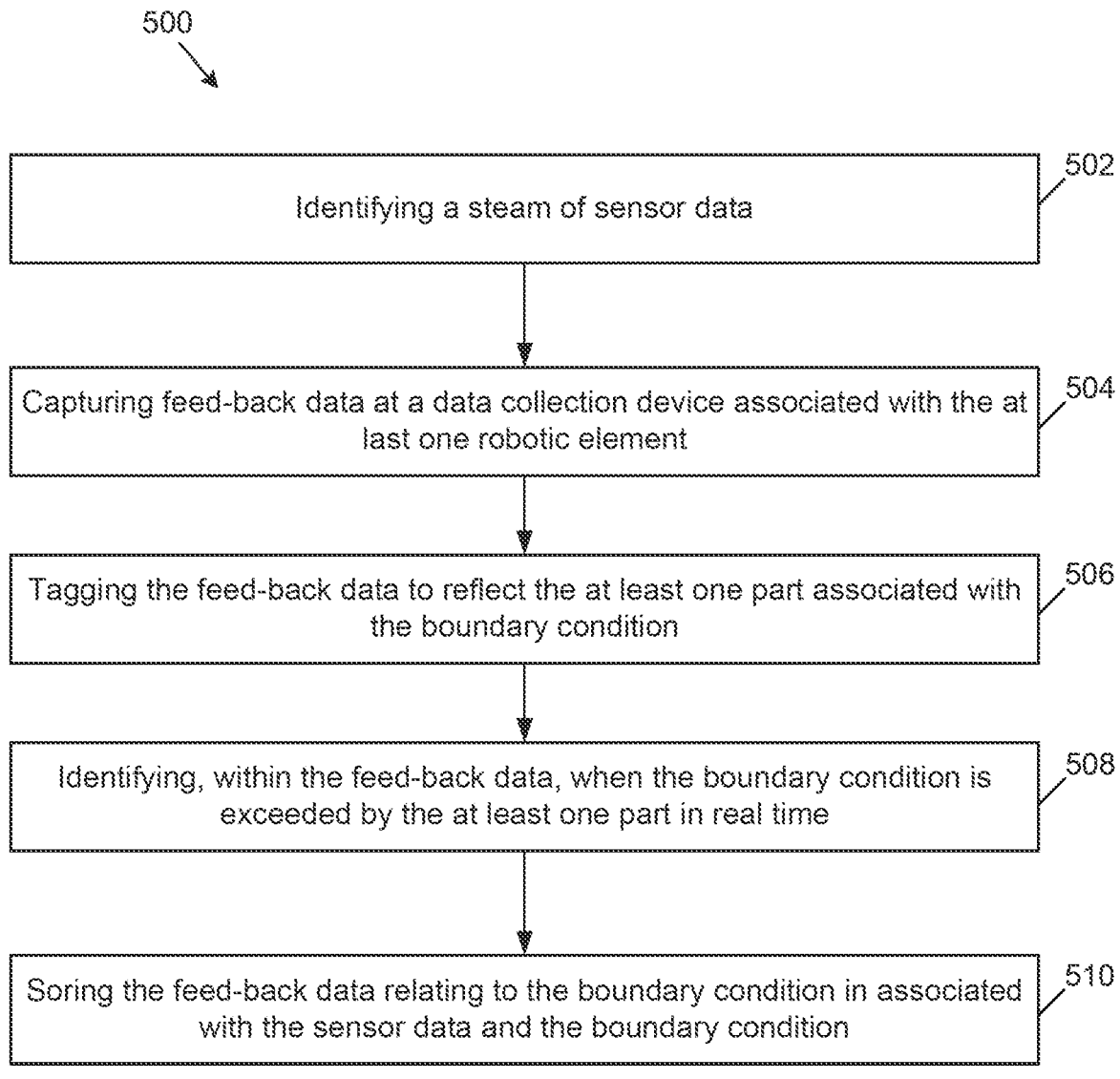

500

502
Identifying a steam of sensor data

504
Capturing feed-back data at a data collection device associated with the at last one robotic element 506
Tagging the feed-back data to reflect the at least one part associated with the boundary condition 508
Identifying, within the feed-back data, when the boundary condition is exceeded by the at least one part in real time 510
Soring the feed-back data relating to the boundary condition in associated with the sensor data and the boundary condition

FIG. 4

SYSTEMS AND METHODS FOR DIAGNOSING MANUFACTURING SYSTEMS

FIELD

This disclosure relates generally to systems and method for diagnosing manufacturing systems.

INTRODUCTION

The following is not an admission that anything discussed below is part of the prior art or part of the common general knowledge of a person skilled in the art.

Manufacturing and automation systems have sophisticated technologies for identifying defects in products produced. However, it can still be difficult to determine the source or cause of the defect in order to remedy the issue. The difficulty may be, at least in part, due to the complexity and the speed of the manufacturing and automation systems.

As such, there is a need for improved systems and methods of diagnosing issues or problems in manufacturing and automation systems. Further, a system is needed that may be incorporated to any manufacturing or automation system, regardless of software limitations.

SUMMARY OF SOME EMBODIMENTS

In accordance with a broad aspect, disclosed herein is a method of observing a manufacturing line, wherein the manufacturing line includes at least one robotic element for moving at least one part, the method comprising receiving, at a processor separate from the manufacturing line, sensor data about the at least one robotic element, and when the sensor data exceeds a boundary condition, triggering a feed-back collection event. The feed-back collection event includes identifying a stream of sensor data, capturing feed-back data at a data collection device associated with the at least one robotic element, tagging the feed-back data to reflect the at least one part associated with the boundary condition, identifying, within the feed-back data, when the boundary condition is exceeded by the at least one part in real time, and storing the feed-back data relating to the boundary condition in association with the sensor data and the boundary condition.

In accordance with another broad aspect, disclosed herein is a method of observing a manufacturing line, wherein the manufacturing line includes at least one robotic element for moving at least one part, the method comprising receiving, at a processor separate from the manufacturing line, sensor data about the at least one robotic element, and when the sensor data exceeds a boundary condition, triggering a feed-back collection event that includes identifying a stream of sensor data, capturing feed-back data at a data collection device associated with the at least one robotic element, tagging the feed-back data to reflect the at least one robotic element associated with the boundary condition, identifying, within the feed-back data, when the boundary condition is exceeded by the at least one robotic element in real time, and storing the feed-back data relating to the boundary condition in association with the sensor data and the boundary condition.

In at least one embodiment, the method includes determining, for the feed-back data, a time-frame related to the boundary condition comprising a particular amount of time before and after the boundary condition is exceeded.

In at least one embodiment, the method is further comprising, after identifying when the boundary condition is exceeded, outputting the feed-back data relating to the boundary condition.

In at least one embodiment, the method is further comprising, when the boundary condition is exceeded, indicating that a boundary condition has been exceeded.

In at least one embodiment, the feed-back data relating to the boundary condition is extracted from the sensor data and stored separately from the sensor data.

In at least one embodiment, the feed-back data is of a multi-media format.

In at least one embodiment, the boundary condition is predetermined by a user.

In at least one embodiment, the time-frame related to the boundary condition is predetermined by a user.

In at least one embodiment, the manufacturing line is observed by an observation system, the observation system comprising a data collection device.

In at least one embodiment, the feed-back data relating to the trigger condition is transferred from the processor separate from the manufacturing line to the observation system for storage.

In another broad aspect, disclosed is an apparatus for diagnosing a manufacturing line having at least one robotic element, the apparatus comprising a data collection device for capturing sensor data associated with the at least one robotic element, and a processor for receiving the captured sensor data from the data collection device, the processor configured to identify sensor data exceeding a boundary condition, wherein the processor is configured to trigger a feed-back collection event when the sensor data exceeds a boundary condition.

In at least one embodiment, the feed-back collection event comprises identifying a stream of sensor data, capturing feed-back data at a data collection device associated with the at least one robotic element, tagging the feed-back data to reflect the at least one part associated with the boundary condition, identifying, within the feed-back data, when the boundary condition is exceeded by the at least one part in real time, and storing the feed-back data relating to the boundary condition in association with the sensor data and the boundary condition.

In at least one embodiment, the feed-back collection event comprises identifying a stream of sensor data, capturing feed-back data at a data collection device associated with the at least one robotic element, tagging the feed-back data to reflect the at least one robotic element associated with the boundary condition, identifying, within the feed-back data, when the boundary condition is exceeded by the at least one robotic element in real time, and storing the feed-back data relating to the boundary condition in association with the sensor data and the boundary condition.

In at least one embodiment, the feed-back collection event further comprises determining, for the feed-back data, a time-frame related to the boundary condition comprising a particular amount of time before and after the boundary condition is exceeded.

In at least one embodiment, the feed-back collection event further comprises after identifying when the boundary condition is exceeded, outputting the feed-back data relating to the boundary condition.

In at least one embodiment, the feed-back collection event further comprises when the boundary condition is exceeded, indicating that a boundary condition has been exceeded.

In at least one embodiment, the feed-back data relating to the boundary condition is extracted from the sensor data and stored separately from the sensor data.

In at least one embodiment, the feed-back data is of a multi-media format.

In at least one embodiment, the boundary condition is predetermined by a user.

In at least one embodiment, the time-frame related to the boundary condition is predetermined by a user.

In at least one embodiment, the manufacturing line is observed by an observation system, the observation system comprising a data collection device.

In at least one embodiment, the feed-back data relating to the trigger condition is transferred from the processor separate from the manufacturing line to the observation system for storage.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the described embodiments and to show more clearly how they may be carried into effect, reference will now be made, by way of example, to the accompanying drawings in which:

FIG. 4 is a block diagram of a method of observing and triggering a feedback collection event, according to at least one embodiment described herein.

DESCRIPTION OF EXAMPLE EMBODIMENTS

Figure 1:
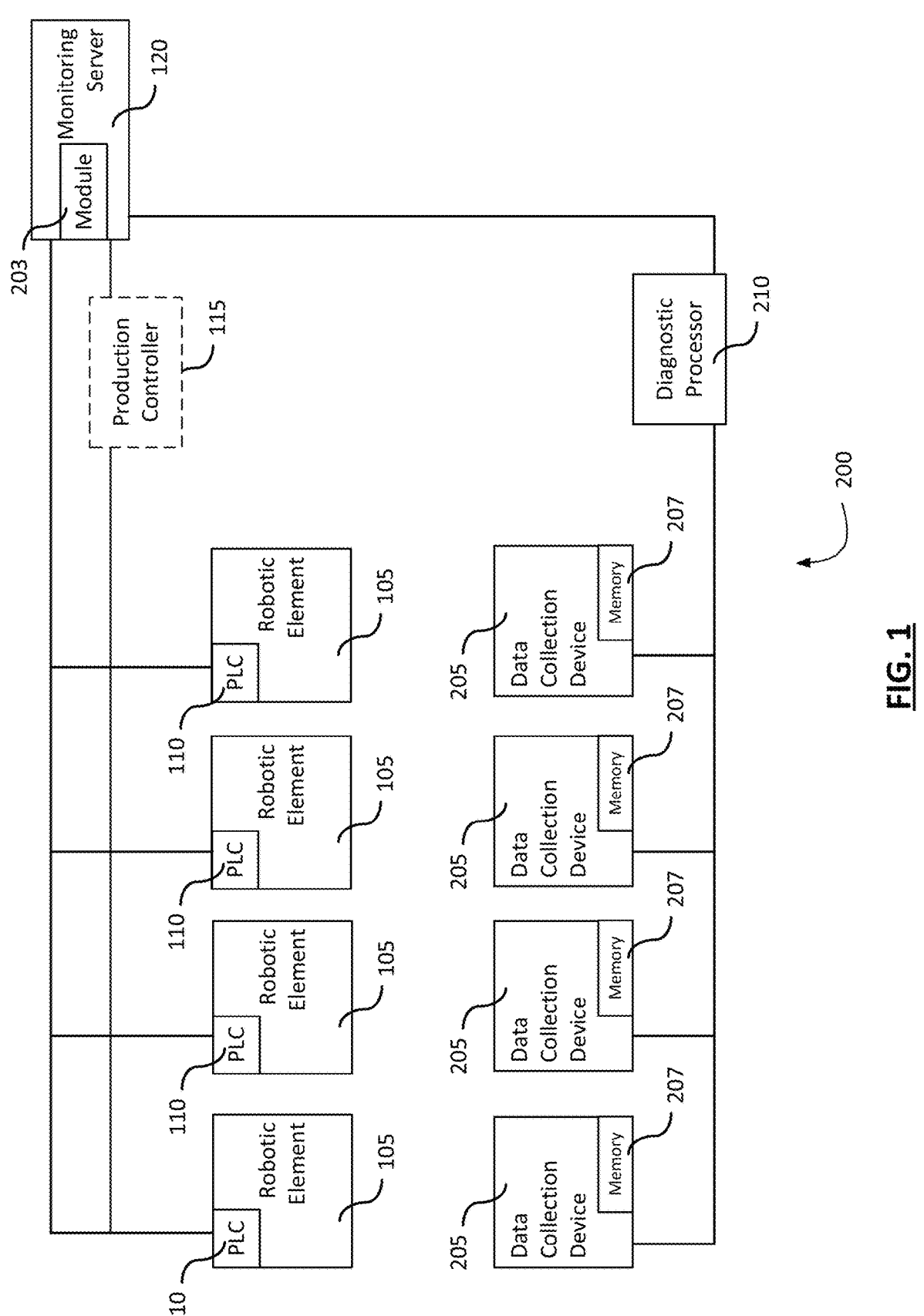
FIG. 1 is a block diagram of an embodiments of a system for diagnosing automation systems.
Figure 2:
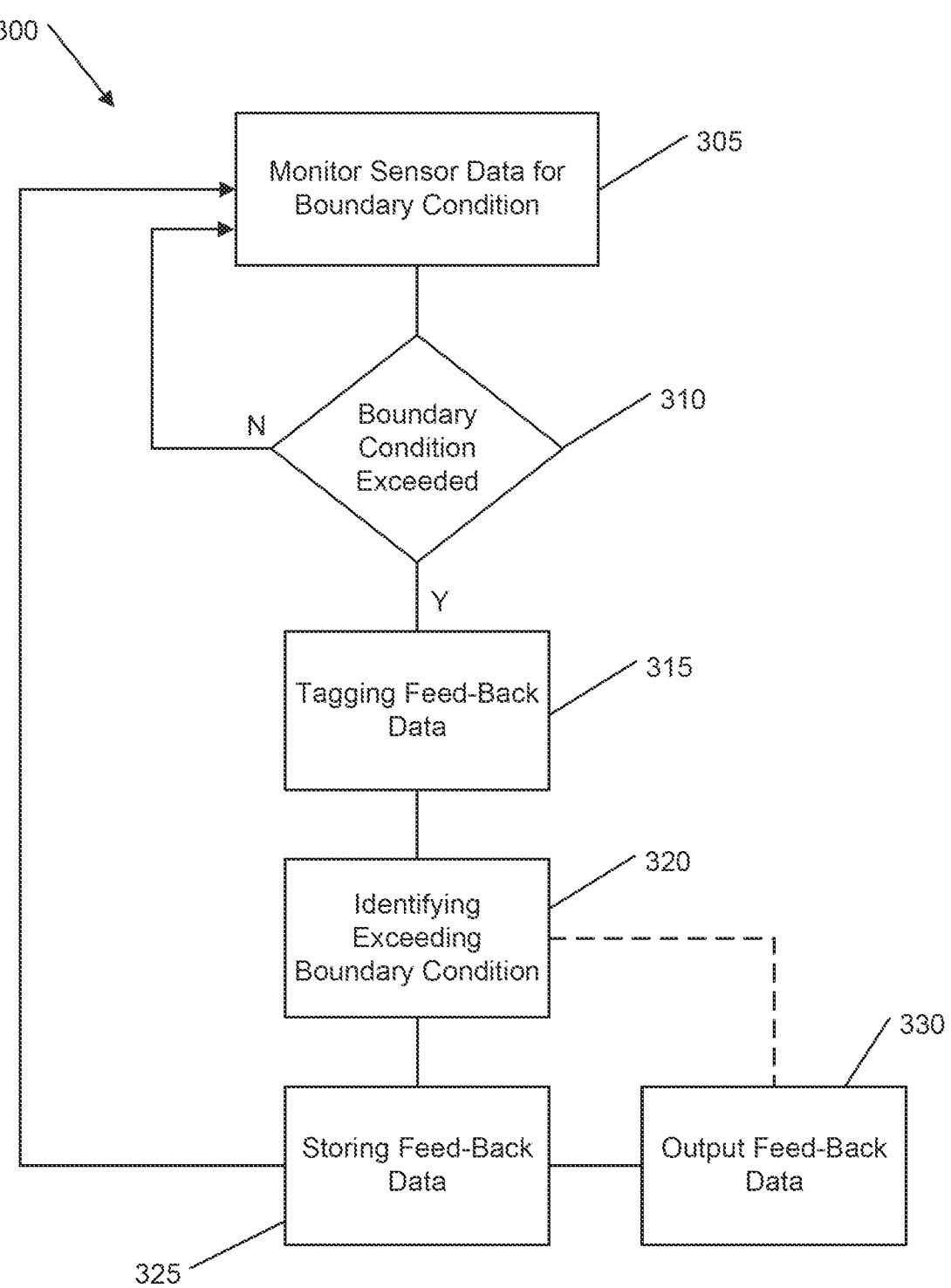
FIG. 2 is a flowchart of an embodiment of a method for diagnosing automation systems.

Various apparatuses will be described below to provide an example of one or more embodiments. No embodiment described below limits any claims and any claims may cover apparatuses that differ from those described below. The claims are not limited to apparatuses, methods or systems having all of the features of any one apparatus, method, or system described below or to features common to multiple or all of the apparatuses, methods and systems described below. It is possible that an apparatus, system or method described herein is not an embodiment of any claim. Any embodiment disclosed herein that is not claimed in this document may be the subject matter of another protective instrument, for example, a continuing patent application, and the applicant(s), inventor(s) and/or owner(s) do not intend to abandon, disclaim or dedicate to the public any such embodiment merely by its disclosure in this document.

Furthermore, it will be appreciated that for simplicity and clarify of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", "mounted" or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", "mounted", and "fastened" distinguish the manner in which two or more parts are joined together.

Some elements herein may be identified by a part number, which is composed of a base number followed by an alphabetical or subscript-numerical suffix (e.g., 112$a$, or 1121). Multiple elements herein may be identified by part numbers that share a base number in common and that differ by their suffixes (e.g., 1121, 1122, and 1123). Elements with a common base number may in some cases be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

It should also be noted that, as used herein, the wording "and/or" is intended to represent an inclusive-or. That is, "X and/or Y" is intended to mean X or Y or both X and Y, for example. As a further example, "X, Y, and/or Z" is intended to mean X or Y or Z or any combination thereof of X, Y, and Z.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Embodiments of the description can be represented as a software product stored in a machine readable medium, such as a computer-readable medium, a processor-readable medium, or a computer useable medium having a computer-readable program code embodied therein. The machine-readable medium can be any suitable tangible medium, including magnetic, optical, or electrical storage medium including a diskette, compact disk read only memory (CD-ROM), memory device, or similar storage mechanism. The machine-readable medium can contain various sets of instructions, code sequences, configuration information, or other data, which, when executed, cause a processor to perform steps in a method according to the embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Disclosed herein are systems and methods for diagnosing automation systems. In said enclosed embodiments, systems may be stand-alone.

Referring first to FIG. 1, shown therein is an example environment including a diagnostic system 200 according to at least one embodiment. A manufacturing line 100 includes at least one robotic element 105. In the illustrated example, four robotic elements 105 are shown. The robotic elements 105 may be, for example, individual machines or equipment or a combination of machines or equipment, or the like. Each robotic element 105 may include an automation controller, such as a programmable logic controller (PLC) 110, which controls the robotic element 105. Each PLC 110 is in communication with one or more servers or controllers, which may include a production controller 115 and/or a production monitoring server 120. The production controller 115 may provide direction control to and configuration of the PLCs 110 and monitor the overall production line 100. The production monitoring server 120 may monitor and process various operation data received from each PLC 110. Examples of operation data could include, but is not limited to, machine identification, time stamp, full machine state, environmental conditions, or any other data that could be provided in relation to a machine or robotic element 105 in the production line. The production controller 115 and the production monitoring server 120 may include a processor and memory, allowing for the processing of various operations by each of these elements. It will be understood that the production controller 115 and the production monitoring server 120 may be combined or may be housed on a single physical computing device or may be distributed across a number of devices.

The diagnostic system 200 includes a diagnostic processor 210 and one or more data collection devices 205. Diagnostic processor 210 may be coupled to the manufacturing line 100 via wireless or wired connections. In some embodiments, the diagnostic system 200 is a system separate to that of the manufacturing line 100. A wireless or wired connection may be made between the manufacturing line 100 and the diagnostic system 200. In such embodiments, the diagnostic system 200 may be used to monitor different manufacturing lines 100. The diagnostic system 200 may be moved between manufacturing lines 100.

Diagnostic processor 210 monitors the sensor data received from the PLC 110, or from the server module 203, and determines boundary conditions or event that can be used to cause/trigger the data collection devices 205 to provide feed-back data related to an event that exceeds a boundary condition, to the diagnostic processor 210.

The incoming sensor data may be saved by the diagnostic processor 210. The sensor data may also be communicated to the PLC 110 of the manufacturing line 100.

In some embodiments, the diagnostic system 200 according to an embodiment herein may include a server module 203 and one or more data collection devices 205. The diagnostic system 200 may be in communication with the manufacturing line 100. The server module 203 may be provided in the production monitoring server 120. The server module 203 may monitor the operation data received from the PLC 110 and may determine boundary conditions or events that can be used to cause/trigger the data collection devices 205 to provide feed-back data related to an event that caused the boundary condition, to the server module 203. In some embodiments, the server module 203 may send server data to the diagnostic processor 210 for analysis.

The term "boundary condition" may refer to an occurrence that may benefit from a review of the feed-back data, such as video, taken around the time frame of the event/boundary condition by one or more of the data collection devices 205.

Boundary conditions determined from the operation data may include machine stoppages, faulty part detection, out of specification operations or parts, a machine not responding or taking an action within or after a set time period, a combination of events or data, and the like. Generally speaking, the boundary condition initiates or indicates a time at which feed-back data is to be gathered or reviewed. The diagnostic processor 210 may cause the data collection devices 205 to provide feed-back data to the diagnostic processor 210. The feed-back data may be a set of data collected around the time of the boundary condition as determined by a diagnostic processor 210.

If the data collection devices 205 are triggered by the server module 203, there is no need to reconfigure the PLC 110 or other elements that may directly affect the production environment. The collection of data can be effective at reducing costs and complexity. In some instances, changes to manufacturing lines can require extensive approvals, validations, or re-validations, which may be cost prohibitive.

Referring back to FIG. 1, four data collection devices 205 are shown. Data collection devices 205 may be any of various capable devices for collecting feed-back data that may be useful in diagnosing an issue. For example, data collection devise 205 may include cameras, sound recorders, pressure sensors, accelerometers, motion sensors, thermal sensors, vibration sensors, humidity sensors, temperature sensors, etc. The feed-back data collected by the data collection devices 205 may depend on the type of data collection device 205 but may include images, video, sound, pressure data, motion data, head data, humidity data, temperature data, etc.

In some embodiments, the data collection device 205 may be a video camera. The camera may be configurable to capture video of any length and with any frame rate.

In some embodiments, the data collection devices 205 may be wirelessly connected with the server module 203 so they may be easily moved to different locations in relation to the one or more robotic elements 105 of the manufacturing line 100.

Each data collection device 205 may include a memory 207 for storing data captured by the data collection device 205. In some embodiments, the data collection device 205 may be in communication with the diagnostic processor 210 where additional data may be stored if the memory 207 is not present or does not have enough storage space. Each data collection device 205 may continuously collect data and if the memory 207 or diagnostic processor 210 becomes full, add new data to over-write the oldest data collected.

In some embodiments, the data collection devices may be in communication with the production monitoring server 120 and the server module 203, either directly or indirectly.

Figure 3:
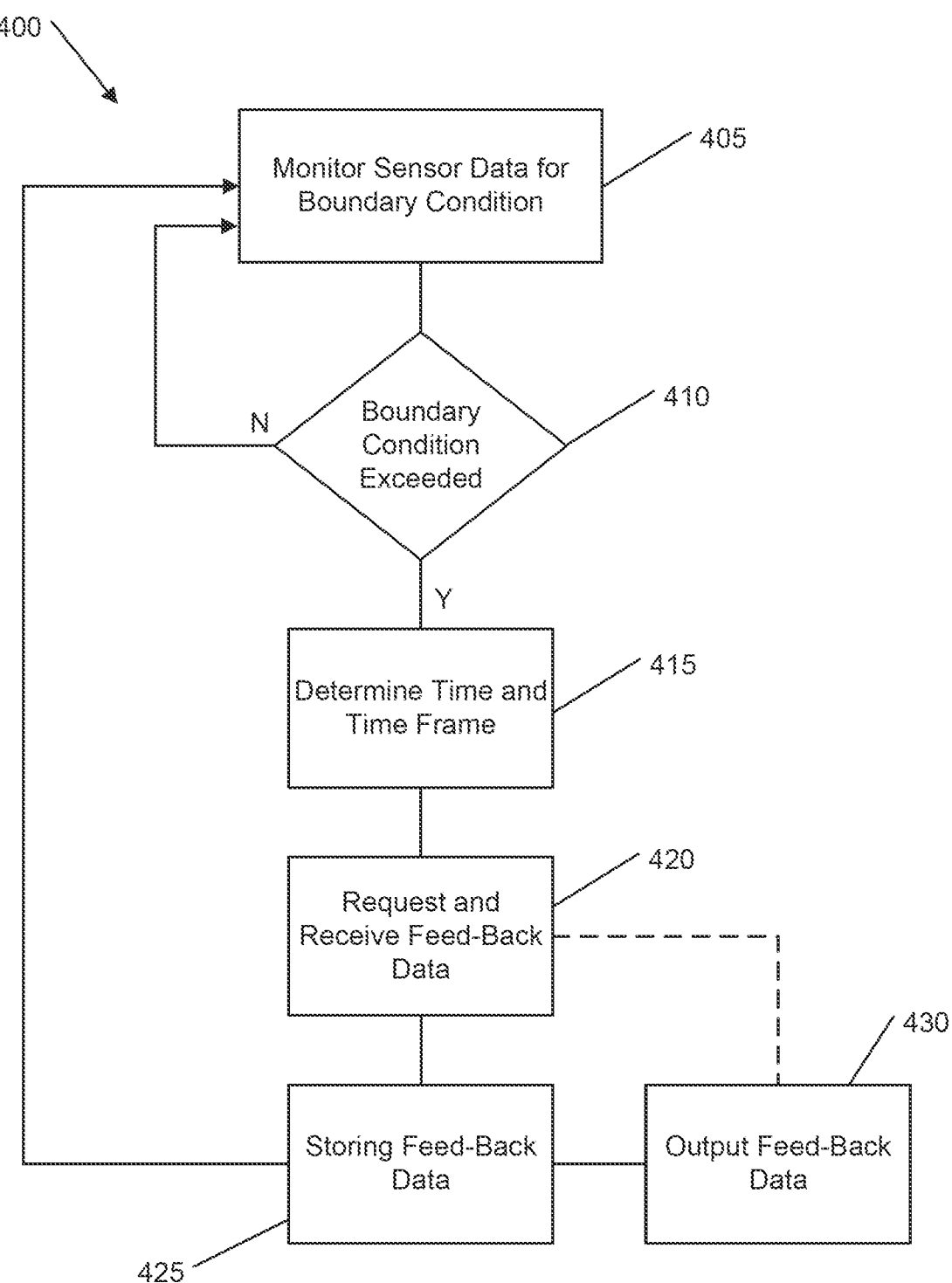
FIG. 3 is a flowchart of another embodiment of a method for diagnosing automation systems.

Referring now to FIG. 3, a flowchart of an embodiment of a method 300 of observing a manufacturing line (such as manufacturing line 100) is shown. In this case, a diagnostic system (such as diagnostic system 200) may be installed and started.

At step 305, the diagnostic system 200 may then monitor the sensor data for indications of an exceeding of one or more boundary conditions related to the robotic elements 105 or the manufacturing line 100 or the like.

At step 310, there is a determination made on whether a predetermined boundary condition has been exceeded. If there is no boundary condition exceeded, the diagnostic system 200 may continue to monitor for the exceeded boundary conditions.

The boundary conditions may be predetermined by a user. In some embodiments, whether a boundary condition is exceeded may be determined by the diagnostic processor 210. The diagnostic processor 210 may indicate that a robotic element is functioning incorrectly, that the parts produced by the robotic element 105 may be outside of the margin of error, or any other instance where the manufacturing line 100 may be malfunctioning. In some other embodiments, whether a boundary condition is exceeded may be determined by the PCL 110 of the manufacturing line 100.

In some embodiments, when the boundary condition has been exceeded, a notification is provided from the diagnostic processor 210 to the user. In some embodiments, the notification may be an alarm, an alert, or any other notification.

At step 315, when a boundary condition is determined to have exceeded, the diagnostic processor 210 tags the feed-back data for the purposes of collecting or gathering the data. The feed-back data is tagged when the boundary condition is exceeded. For example, if a robotic element 105 malfunctions, the predetermined boundary condition may be exceeded. As such, the feed-back data that was captured while monitoring the robotic element 105 may be flagged at a time around when the boundary condition is exceeded.

The tag may be used for the end user to review the feed-back data related to the boundary conditions. In some embodiments, the tag may be a "part tag" associated with a particular part or product travelling through the manufacturing line 100 which that the feed-back data includes a tag at the moment when a part is at or passing a particular robotic element 105. In such embodiments, the end user may be able to view all feed-back data for a particular part after a fault is discovered (such as a defective part). In some embodiments, the tag may be a "element tag" associated with a particular robotic element 105 of the manufacturing line 100.

In some embodiments, the feed-back data may be continually captured. A user may access the feed-back data and move directly to the point of the feed-back data where the boundary condition was exceeded, based on the tag, while still having the opportunity to review the feed-back data outside of the tagged time frame. In some embodiments, the user may be able to filter the feed-back data based on various tags and view selected tags.

The tagged feed-back may be accessed as a live stream of continuous data or can be stored and viewed at a later time.

At step 320, once the feed-back data has been tagged, the diagnostic processor 210 identifies when the boundary condition has been exceeded in real time.

In some embodiments, when a boundary condition is exceeded, the diagnostic processor 210 determines the time that the boundary condition was exceeded, and a time frame related to the event that exceeded the boundary condition. The time frame may be a predetermined time frame of a set period, may be based on the type of boundary condition, or may be calculated, either in real time or in advance, based on the type of boundary condition. The time frame may generally include a predetermined amount of time before the boundary condition and may also include a predetermined amount of time after the boundary condition. The amount of time before and after may be different or may be the same for different boundary conditions or the like. The time frame may be different for different robotic elements 105.

At step 325, the diagnostic processor 210 has identified when the boundary condition was exceeded and stores the feed-back data associated with the boundary condition. The feed-back data may be stored within the diagnostic processor 210. The feed-back data may also be stored at individual data collection devices 205.

Optionally, at step 330, the diagnostic system 200 may output the feed-back data associated with the boundary condition. The feed-back data may be presented together with the boundary condition and/or operational condition that caused the boundary condition to be exceeded. In some embodiments, other related data may be presented with the feed-back data, such as collected sensor data, information on the product being manufactured, information on the robotic element 105, or any other related data.

In some embodiments, prior to data storage, the diagnostic processor 210 may extract the feed-back data relating to the boundary condition from the sensor data. The feed-back data may then be stored separately from the sensor data. In some embodiments, the extracted feed-back data may be output separately from the sensor data.

In some embodiments, a user is able to access the feed-back data stored within the diagnostic processor 210 or the data collection devices 205. The feed-back data can be presented to a user when a boundary condition has been exceeded, or when a user has requested the feed-back data.

For example, in some embodiments, the feed-back data may be of a video format. The user may then view the captured video on any appropriate display, including mobile and computer devices and the like, in order to determine the cause of the event/boundary condition. Corrective action can then be taken.

In some embodiments, the diagnostic server 3210 may provide access for the user to enter configurable settings into the diagnostic system 200. For example, the user may set the types of events/boundary conditions for monitoring, the predetermined time frames/periods or ways of calculating the time frames/periods, or any other characteristic of the diagnostic system 200.

Turning to FIG. 3, a flowchart of a method 400 of diagnosing automation systems is shown, in this case, by determining the time and a relevant time frame around the boundary condition. In this case, at 415, feed-back data is collected and segments of the feed-back data are selected that are related to the exceeding of a boundary condition for review.

At step 415, the diagnostic processor 210 may determine the time that the boundary condition was exceeded, and a time frame related to the event that exceeded the boundary condition. The time frame may be a predetermined time frame of a set period, may be based on the type of boundary condition, or may be calculated, either in real time or in advance, based on the type of boundary condition. The time frame may generally include a predetermined amount of time before the boundary condition and may also include a predetermined amount of time after the boundary condition. The amount of time before and after may be different or may be the same for different boundary conditions or the like. The time frame may be different for different robotic elements 105.

Once the time has been determined, at step 420, the diagnostic processor 210 may request the feed-back data for the time frame from one or more of the data collection device 205. In some embodiments, the request may be in real time. For example, the boundary condition may be exceeded and the time frame may be predetermined. Once the boundary condition is exceeded, the request for the feed-back data from the data collection device 205 may be made by the diagnostic processor 210.

The data collection device 205 may then access the memory 207 and may send the feed-back data from the time frame to the diagnostic processor 210, which may receive the feed-back data.

The feed-back data is then stored, at step 425, at the diagnostic processor 210 or the data collection device 205.

Reference is now made to FIG. 4, which shows a block diagram of a method 500 of triggering a feed-back collection event from observation of a manufacturing line 100, the manufacturing line 100 including at least one robotic element 205 for moving at least one part. A processor separate from the manufacturing line 100 receives sensor data about the at least one robotic element 205, and when the sensor data exceeds a boundary condition, a feed-back collection event is triggered.

The steps of the method as described herein may be conducted remotely, by a human operator controlling the operations of the above-described system elements, or autonomously, by a processor configured to automatically control the operations thereof.

At step 502 of method 500, a stream of sensor data is identified by the diagnostic processor 210.

At step 504 of method 500, feed-back data is captured at the data collection device 205 that is associated with at least one robotic element 105.

At step 506 of method 500, the feed-back data is tagged to reflect the at least one part associated with the boundary condition.

In some embodiments, the feed-back data may be tagged to reflect the robotic element 105 associated with the boundary condition.

At step 508 of method 500, identification is done within feed-back data to determine when the boundary condition is exceeded by the at least one part in real time.

In some embodiments, identification may be completed to determined when the boundary condition is exceeded by the robotic element 105.

At step 510 of method 500, the feed-back data relating to the boundary condition in association with the sensor data and the boundary condition is stored. The feed-back data may be stored at the diagnostic processor 210 or the data collection devices 205.

The method 500 may be repeated as many times as desired.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A method of observing a manufacturing line, wherein the manufacturing line includes at least one robotic element for moving at least one part, the method comprising:

receiving, at a processor separate from the manufacturing line, sensor data about the at least one robotic element; and when the sensor data exceeds a boundary condition, triggering a feed-back collection event that includes:

identifying a stream of sensor data;

capturing feed-back data at a data collection device associated with the at least one robotic element;

tagging the feed-back data to reflect at least one of the at least one part or the at least one robotic element associated with the boundary condition;

identifying, within the feed-back data, when the boundary condition is exceeded by the at least one part or the at least one robotic element in real time; and storing the feed-back data relating to the boundary condition in association with the sensor data and the boundary condition.

2. The method of claim 1, further comprising determining, for the feed-back data, a time-frame related to the boundary condition comprising a particular amount of time before and after the boundary condition is exceeded.

3. The method of claim 1, further comprising, after identifying when the boundary condition is exceeded, outputting the feed-back data relating to the boundary condition.

4. The method of claim 1, further comprising, when the boundary condition is exceeded, indicating that a boundary condition has been exceeded.

5. The method of claim 1, wherein the feed-back data relating to the boundary condition is extracted from the sensor data and stored separately from the sensor data.

6. The method of claim 1, wherein the feed-back data is of a multi-media format.

7. The method of claim 1, wherein the boundary condition is predetermined by a user.

8. The method of claim 1, wherein the time-frame related to the boundary condition is predetermined by a user.

9. The method of claim 1, wherein the manufacturing line is observed by an observation system, the observation system comprising a data collection device.

10. The method of claim 9, wherein the feed-back data relating to the trigger condition is transferred from the processor separate from the manufacturing line to the observation system for storage.

11. An apparatus for diagnosing a manufacturing line having at least one robotic element, the apparatus comprising:

a data collection device for capturing sensor data associated with the at least one robotic element; and a processor, separate from the manufacturing line, for receiving the captured sensor data from the data collection device, the processor configured to identify sensor data exceeding a boundary condition;

wherein the processor is configured to trigger a feed-back collection event when the sensor data exceeds a boundary condition, the feed-back collection event including tagging feed-back data to reflect at least one of the at least one robotic element or a part associated with the boundary condition.

12. The apparatus of claim 11, wherein the feed-back collection event further comprises:

identifying a stream of sensor data;

capturing feed-back data at a data collection device associated with the at least one robotic element;

tagging the feed-back data to reflect at least one of the at least one part or the at least one robotic element associated with the boundary condition;

identifying, within the feed-back data, when the boundary condition is exceeded by the at least one part or the at least one robotic element in real time; and storing the feed-back data relating to the boundary condition in association with the sensor data and the boundary condition.

13. The apparatus of either claim 12, the feed-back collection event further comprises determining, for the feed-back data, a time-frame related to the boundary condition comprising a particular amount of time before and after the boundary condition is exceeded.

14. The apparatus of claim 12, the feed-back collection event further comprises, after identifying when the boundary condition is exceeded, outputting the feed-back data relating to the boundary condition.

15. The apparatus of claim 12, the feed-back collection event further comprises, when the boundary condition is exceeded, indicating that a boundary condition has been exceeded.

16. The apparatus of claim 12, wherein the feed-back data relating to the boundary condition is extracted from the sensor data and stored separately from the sensor data.

17. The apparatus of claim 11, wherein the feed-back data is of a multi-media format.

18. The apparatus of claim 11, wherein the manufacturing line is observed by an observation system, the observation system comprising a data collection device.

\* \* \* \* \*